(No Model.)

P. J. BEIERSMITH.
RUBBER TIRED WHEEL.

No. 424,452.

Patented Apr. 1, 1890.

WITNESSES
Carroll J. Webster.
Anna J. Dehaney.

INVENTOR
Peter J. Beiersmith
By William Webster
Atty.

UNITED STATES PATENT OFFICE.

PETER J. BEIERSMITH, OF TOLEDO, OHIO, ASSIGNOR OF ONE-HALF TO HENRY L. PHELPS, OF SAME PLACE.

RUBBER-TIRED WHEEL.

SPECIFICATION forming part of Letters Patent No. 424,452, dated April 1, 1890.

Application filed November 9, 1889. Serial No. 329,750. (No model.)

*To all whom it may concern:*

Be it known that I, PETER J. BEIERSMITH, a citizen of the United States, residing at Toledo, in the county of Lucas and State of Ohio, have invented certain new and useful Improvements in Methods of Securing Rubber Tires in Metal Wheel-Rims; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to a method of securing rubber tires in metal wheel-rims, and has for its object to secure the rubber tire within the rim by means of impinging the sides of the same against the sides of the rubber tire.

A further object is to construct a tire with concave sides, whereby the metal rim of the wheel may be corrugated circumferentially, to cause the sides of the rim to bear frictionally against the corrugated surface of the rubber tire to hold the same in place.

A further object is to cause the outer edges of the rim to flare outwardly slightly from the rubber tire, to allow of inserting expanding devices for spreading the upturned corrugated sides of the metal rim for the removal of the rubber tire when worn.

The invention consists in the various steps hereinafter described, and pointed out in the claims.

Figure 1:
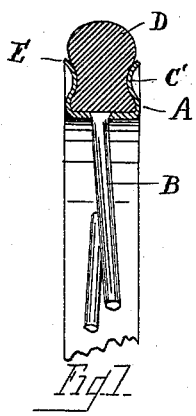
Figure 2:
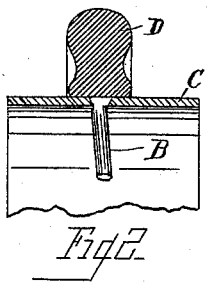
Figure 3:
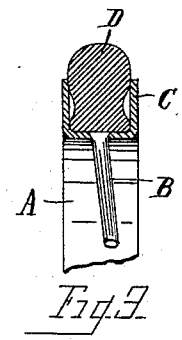

In the drawings, Figure 1 is a transverse section of a wheel-rim and tire secured therein. Fig. 2 is a like view showing the rim as it appears when the spokes are secured thereto and prior to the first step in the method of securing the tire therein. Fig. 3 is a like view showing the first step in the method of securing the rubber tire within the rim.

A designates the rim or felly, to which are secured spokes B in any preferred manner. Rim A is formed of a width to allow of the sides C being bent at right angles to the central portion, as shown in Figs. 2 and 3, the sides being turned at right angles thereto, as shown in Fig. 3, after the spokes are secured to the same, and the rubber tire D or any tire of an analogous character is placed within the channel and the upturned surface of the sides C are corrugated, as at C', Fig. 1, to cause the sides to bear frictionally upon the sides of the rubber tire and hold the same in place.

By reference to Fig. 1 it will be seen that the act of corrugating the rim circumferentially tends to flare the upper or outer edges E of the sides C to cause the same to extend slightly from the rubber tire, thereby preventing an abrasion of the same and allowing the tire to cushion upon the smooth flare of the rim when compressed by contact with the ground or pavement and allowing of the insertion of rollers or spreading devices for opening the channel when it is desired to remove the tire when worn or fractured.

In practice I prefer to form the rubber tire with concave sides, as shown, although it will be apparent that I may compress a tire of any desired shape at the central portion when in the act of corrugating the sides C of the rim. I may also form the rim of greater thickness at the central portion than at the edges, if desired, to cause the edges E to flare outwardly more readily.

By the improved method herein described I am enabled to dispense with the use of adhesives in securing the tire to the rim, and may remove the tire when worn or broken to replace the same by a new tire, if desired.

What I claim is—

1. The herein-described method of securing a compressible tire upon a wheel-rim, which consists in turning flanges of the rim at right angles to the portion in which the spokes are secured, then inserting the tire, then forming circumferential corrugations in the sides of the flanges to cause them to bear tightly against the sides of the tire, and, finally, flaring the outer edges of the flanges away from the tire, substantially as and for the purposes described.

2. The herein-described method of securing a rubber or compressible tire to a metal rim, which consists in placing thereon a rubber tire having concave sides, and then corrugating the rim at right angles to the tread and circumferentially of the same, to impinge upon the concave sides of the tire and throw the outer edges outwardly beyond the sides of the same, as and for the purpose set forth.

In testimony that I claim the foregoing as my own I hereby affix my signature in presence of two witnesses.

PETER J. BEIERSMITH.

Witnesses:
WILLIAM WEBSTER,
CARROLL J. WEBSTER.